(12) United States Patent
Friedman (10) Patent No.: US 10,094,170 B2
(45) Date of Patent: *Oct. 9, 2018

(54) ELECTRICAL WARNING SYSTEM FOR A CLIMBABLE STRUCTURE

(71) Applicant: Benjamin Friedman, St. Johns, FL (US)

(72) Inventor: Benjamin Friedman, St. Johns, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/653,085

(22) Filed: Jul. 18, 2017

(65) Prior Publication Data

US 2017/0314328 A1 Nov. 2, 2017

Related U.S. Application Data

(63) Continuation-in-part of application No. 14/793,090, filed on Jul. 7, 2015, now Pat. No. 9,711,028.

(51) Int. Cl.
| | |
|---|---|
| *E06C 7/00* | (2006.01) |
| *E06C 1/06* | (2006.01) |
| *G01L 1/16* | (2006.01) |
| *G08B 21/04* | (2006.01) |

(52) U.S. Cl.
CPC ............ *E06C 7/003* (2013.01); *E06C 1/06* (2013.01); *G01L 1/16* (2013.01); *G08B 21/0461* (2013.01)

(58) Field of Classification Search
CPC ........ B60Q 1/1423; B60Q 1/44; B60Q 1/445; B60R 22/48; E06C 1/06; E06C 1/12; E06C 1/18; E06C 1/387; E06C 5/44; E06C 7/003; E06C 7/006; G01L 1/16; G08B 21/02; G08B 21/0461; G08B 21/0469; H01H 47/001
USPC ..... 182/18, 129; 340/541, 573.1, 666, 686.1
See application file for complete search history.

(56) References Cited

U.S. PATENT DOCUMENTS

| | | | | |
|---|---|---|---|---|
| 5,946,368 A | * | 8/1999 | Beezley | G07C 9/00 377/17 |
| 2005/0173189 A1 | * | 8/2005 | Berardi | E06C 7/003 182/18 |
| 2009/0139798 A1 | * | 6/2009 | Bernard | E06C 7/003 182/18 |
| 2010/0018800 A1 | * | 1/2010 | Ventura | E06C 7/003 182/18 |
| 2011/0148645 A1 | * | 6/2011 | Sarmiento | E06C 1/18 340/665 |

(Continued)

*Primary Examiner* — Quan-Zhen Wang
*Assistant Examiner* — Stephen Burgdorf
(74) *Attorney, Agent, or Firm* — Glenn E. Gold, P.A.; Glenn E. Gold (57) ABSTRACT

A warning circuit for use on ladders includes a first sensor responsive to the placement of a first of a user's feet thereon and a second sensor responsive to the placement of a second of the user's feet thereon. The second sensor is electrically connected in series to the first sensor, and a relay is electrically connected in series to one of the first and second sensors. A power source has a power output terminal electrically connected in series to the other of the sensors connected in series. A sound device is electrically connected to a load output of the relay and to the power source. The load output of the relay is energized only when the first sensor is activated prior to activation of the second sensor whereupon the load output then energizes the sound device.

17 Claims, 6 Drawing Sheets

(56) References Cited

U.S. PATENT DOCUMENTS

| | | | | |
|---|---|---|---|---|
| 2012/0291564 A1* | 11/2012 | Amos | .................. | G01C 22/006 |
| | | | | 73/862.045 |
| 2013/0113617 A1* | 5/2013 | Wang | ...................... | E06C 7/003 |
| | | | | 340/521 |
| 2016/0110981 A1* | 4/2016 | Chin | ...................... | G08B 21/02 |
| | | | | 340/573.1 |

* cited by examiner

ELECTRICAL WARNING SYSTEM FOR A CLIMBABLE STRUCTURE

CROSS-REFERENCE TO RELATED APPLICATIONS

This U.S. non-provisional patent application is a continuation-in-part (CIP) of, and claims priority to, co-pending U.S. non-provisional patent application Ser. No. 14/793,090 (issuing as U.S. Pat. No. 9,711,028 on Jul. 18, 2017), the entire contents of which are incorporated-by-reference herein.

FIELD OF THE INVENTION

The present disclosure generally relates to apparatuses and methods for determining whether an individual is ascending or descending rungs of a ladder or other structures containing rungs, steps, stairs and the like. Furthermore, the present disclosure relates to such apparatuses and methods incorporating a warning feature integrated with the structure, to provide a warning signal to an individual when approaching upper steps/rungs during ascent, or when approaching lower steps/rungs during descent.

BACKGROUND OF THE INVENTION

There are many situations where it would be useful to provide an individual ascending or descending a stepped apparatus with an indication that the individual is nearing an upper or lower portion of the stepped apparatus. As used herein, the term "stepped" is intended to include rungs. For example, such an indication would be very useful in the case of ladders. Ladders have become a useful tool to almost every individual in society and permit individuals to climb to heights unreachable without some such an aid. Individual ladders can range from small stepladders having 2-3 rungs allowing an individual to access that one item just out of reach to large extension ladders that can extend to 40 feet and more for scaling large walls, trees, and buildings. One or more ladders can be found in almost every household and are utilized by professional tradesmen of all types.

Unfortunately, the design and usage of a ladder also contributes to its inherent instability and danger. A ladder is typically constructed of two spaced apart vertical stiles with a plurality of regularly spaced rungs extending between the stiles. The bottom end of each stile also functions as the support foot for the ladder at its base. While the base of some ladders may be wider than the ladder top, the overall width of the ladder is relatively narrow when compared to its height. As the width to height ratio decreases (with increasing ladder height) the lateral stability of the ladder also decreases such that a minor lateral shift in the combined center of gravity of the ladder, including the user who is climbing the ladder, can result in an unwanted lateral shift of the ladder. As the user climbs the ladder the combined center of gravity also translates up the ladder, and consequently the danger from a minor lateral shift in the center of gravity increases proportionately as the center of gravity rises. In extreme cases, the unwanted lateral shift can and often does result in the ladder falling to the ground with the user suffering serious injuries as a result thereof. The U.S. Consumer Product Safety Commission (CPSC) reports that each year there are in excess of 150,000 emergency room-treated injuries in the U.S. relating to ladders. A significant portion of which are attributable to ladder falls.

These instabilities require the total concentration of the individual climbing or descending the ladder. Probably the greatest danger to a climber is when he is approaching the topmost or bottommost rungs. He is often unable to look down to determine on which rung he is standing. Consequently, while ascending, he may think he has more rungs on which he can step at the top of the ladder thereby resulting in the ladder tipping or losing a stable foothold resulting in the ladder tipping while at a significant height. Also, when descending, he may believe he is on the bottom rung and prepare his next step for dismounting from the ladder. If however, he has misjudged the rung, he may end up attempting to dismount from a rung higher on the ladder and then fall the remainder of the way to the ground.

The inability to determine the exact rung on which he is standing at the top while climbing or at the bottom when descending will very likely result in injury to the climber unless he is able to determine when he has reached a specific top or bottom rung. Therefore, there is a need for a warning system on the ladder to automatically indicate to the climber when he has reached the top or the bottom to prevent injury to the climber. As will be apparent to those skilled in the art, such a warning system is also applicable to a climber of a set of stairs or any other climbable structure incorporating steps, rungs and the like.

SUMMARY OF THE INVENTION

The present disclosure is generally directed to an electronic warning circuit for integration with a structure incorporating steps, rungs or the like, wherein the electronic warning circuit functions to determine whether an individual climbing upon the structure is in the process of ascending the structure or descending the structure.

In an initial exemplary implementation, such an electronic warning circuit is integrated with a ladder of the type having a plurality of spaced-apart rungs for warning a user that he is approaching an end of the ladder in a single direction. The warning circuit may include a first sensor responsive to the placement of a first of a user's feet thereon and a second sensor responsive to the placement of a second of the user's feet thereon. Preferably, the second sensor is electrically connected in series to the first sensor. A relay may be electrically connected in series with one of the first and second sensors, and a power source may be provided having a power output terminal electrically connected in series to the other of the first and second sensors connected in series. A device for providing a warning signal/indication (e.g. audible, visual or tactile) is preferably provided electrically connected to a load output of the relay and to the power source. Preferably, the load output of the relay is energized only when the first sensor is activated prior to activation of the second sensor, whereupon the load output then energizes the warning device.

In an aspect, the relay may be a single shot latching relay.

In another aspect, the load output, when energized, may be energized for a predetermined period of time and subsequently de-energized.

In another aspect, the first sensor may be a normally open push-to-make switch and the second sensor may be a normally open momentary push-to-make switch.

In a still further aspect, the single shot latching relay may include a start switch terminal, a common terminal, a power input terminal, and a load output terminal. The start switch terminal may be electrically connected to one of the sensors such that the power terminal of the power source, the first sensor, the second sensor, and the start switch terminal are electrically connected in series. The common terminal may be electrically connected to a common terminal of the power source and the power input terminal may be electrically connected to the power terminal of the power source. The load output terminal may be electrically connected to the warning signal indicator, such as, for example, a sound device, and the sound device (or other warning signal indicator) further connected to the common terminal of the power source.

In another aspect, the power source may be a battery, wherein the power output terminal of the power source is a positive terminal of the battery and the common terminal of the power source is a negative terminal of the battery.

In another aspect, the warning indication device may be a sound-emitting piezo sound generator, a light-emitting device and/or a tactile output device such as a vibration-emitting device.

In a further exemplary implementation, a safety ladder incorporating a warning circuit indicating the approach of an individual toward an end of the safety ladder may include a conventional ladder having two stiles laterally spaced-apart from one another, and a plurality of rungs substantially regularly spaced therealong. The rungs may have opposite ends affixed to and laterally extending between the stiles. An electronic warning circuit sensing a user approaching an end of the ladder and emitting a signal in the form of an audible warning in response thereto may include a first sensor affixed to a first of two adjacent rungs and responsive to the placement of a first one of a pair of a climber's feet thereon. A second sensor may be provided affixed to a second one of the two adjacent rungs and responsive to the placement of a second one of the climber's feet thereon, wherein the second sensor is electrically connected in series to the first sensor. A relay may be provided electrically connected in series to one of the first and the second sensors. A power source may be provided having a power output terminal electrically connected in series to the other of the sensors in series therewith, and warning signal indicator, for example, in the form of a sound-emitting device, electrically connected to a load output of the relay and to the power source. The load output of the relay is preferably energized only when the first sensor is activated prior to activation of the second sensor, whereupon the load output subsequently energizes the sound-emitting device.

In another aspect, the relay may be a single shot latching relay.

In another aspect, the load output, when energized, may be energized for a predetermined period of time and then de-energized.

In another aspect, the first sensor may be a normally open push-to-make switch and the second sensor a normally open momentary push-to-make switch.

In yet another aspect, the single shot latching relay may include a start switch terminal, a common terminal, a power input terminal, and a load output terminal. The start switch terminal may be electrically connected to one of the sensors such that the power terminal of the power source, the first sensor, the second sensor, and the start switch terminal are electrically connected in series. The common terminal may be electrically connected to a common terminal of the power source, and the power input terminal may be electrically connected to the power terminal of the power source. The load output terminal may be electrically connected to the sound-emitting device, with the sound-emitting device further connected to the common terminal of the power source.

In another aspect, the power source may be a battery, wherein the power terminal is a positive terminal of the battery and the common terminal is a negative terminal of the battery.

In still another aspect, the sound-emitting device may be an electrical acoustical device used to reproduce sound, such as, for example, a piezo sound generator.

In another aspect, the two adjacent rungs may be proximate to a top, or upper end, of the ladder, wherein the first rung is a lower one of the two adjacent rungs and the second rung is an upper one of the two adjacent rungs.

In a still further aspect, the two adjacent rungs may be the lowermost two rungs of the ladder, wherein the first rung is an upper one of the two adjacent rungs and the second rung is a lowermost rung of the two adjacent rungs.

In a further exemplary implementation, a safety ladder incorporating a warning circuit indicating when a user approaches a top or a bottom of the safety ladder may comprise a ladder having two stiles laterally spaced-apart from one another and having a plurality of spaced-apart rungs substantially regularly spaced therealong. The rungs may be affixed to, and laterally extend between, the stiles. An upper electronic warning circuit may be incorporated with two adjacent rungs proximate to a top or upper end of the ladder for sensing a user ascending the ladder. The upper electronic warning circuit may issue a warning signal, such as an audible warning alert, in response thereto, wherein the upper electronic warning circuit may include a first sensor affixed to a lower one of the two upper adjacent rungs and responsive to the placement of a first one of a pair of a climber's feet thereon. A second sensor may be affixed to an upper one of the two upper adjacent rungs and responsive to the placement of a second one of the climber's feet thereon, wherein the second sensor is electrically connected in series to the first sensor. A single shot latching relay may be provided electrically connected in series to one of the first or the second sensors, and a power source having a power output terminal that is electrically connected in series to the other of the sensors in series. A sound device may be electrically connected to a load output of the single shot latching relay and to the power source. Preferably, the load output of the relay is energized only when the first sensor is activated prior to activation of the second sensor, the load output subsequently energizing the sound-emitting device. A lower electronic warning circuit may similarly be incorporated with two adjacent lowermost rungs of the ladder for the purpose of sensing the user (i.e., climber) descending the ladder. The lower electronic warning circuit may issue, for example, an audible warning in response thereto, wherein the lower electronic warning circuit includes a first sensor affixed to an upper one of the two lowermost adjacent rungs and is responsive to the placement of a first of a user's feet thereon. A second sensor may be affixed to a lower one of the two lowermost adjacent rungs and responsive to the placement of a second of the user's feet thereon wherein the second sensor is electrically connected in series to the first sensor. A single shot latching relay may be electrically connected in series to one of the first and second sensors. A power source may be provided having a power output terminal electrically connected in series to the other of the sensors in series. A sound device may be electrically connected to a load output of the single shot latching relay and to the power source. The load output of the relay is preferably energized only when the first sensor is activated prior to activation of the second sensor, whereupon the load output then energizes the sound device.

In another aspect, the first sensor may be a normally open push-to-make switch and the second sensor may be a normally open momentary push-to-make switch.

In a still further aspect, the single shot latching relay may include a start switch terminal, a common terminal, a power input terminal, and a load output terminal. The start switch terminal may be electrically connected to one of the sensors such that the power terminal of the power source, the first sensor, the second sensor, and the start switch terminal are electrically connected in series. The common terminal may be electrically connected to a common terminal of the power source and the power input terminal may be electrically connected to the power terminal of the power source. The load output terminal is preferably electrically connected to the sound device and the sound device may be further connected to the common terminal of the power source.

In yet another aspect, the upper electronic warning circuit and the lower electronic warning circuit may be powered, for example, by a single battery.

Significantly, as will be apparent to those skilled in the art, in another aspect alternative electronic components may be employed without departing from the intended scope of the invention. For example, as used herein the term "normally open momentary switch" used to describe the second sensors associated with the most distal one of each of the upper and lower pairs of rungs is intended to describe an electronic component that produces a single, brief "on" pulse. Accordingly, by way of example, the respective second sensors may comprise piezo switches. Likewise, while the exemplary implementations generally refer to a "sound device," such as a piezo sound generator, it will be readily apparent to those skilled in the art that alternatively warning signal devices, such as light-emitting components and vibration-inducing components, may be incorporated in lieu of, or in addition to, sound-emitting devices, relays other than "non-latching relays" may be employed, and power sources other than "a battery" may be employed. Furthermore, while the present disclosure primarily refers to the incorporation of a warning system integrated with a conventional ladder, the present disclosure is not intended to be so limiting. For instance, the present invention may be incorporated into or integrated with any climbable structure incorporating "rungs," "steps," and "stairs," including, for example, a step ladder, a stool and a stairwell, to name just a few examples of structures that could include treads. Furthermore, the purpose of integrating such a warning system into a climbable structure may be expanded beyond safety. That is, the apparatus of the present invention may be incorporated for any application where it may be beneficial to know whether an individual is ascending or descending a climbable structure.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF EXEMPLARY IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
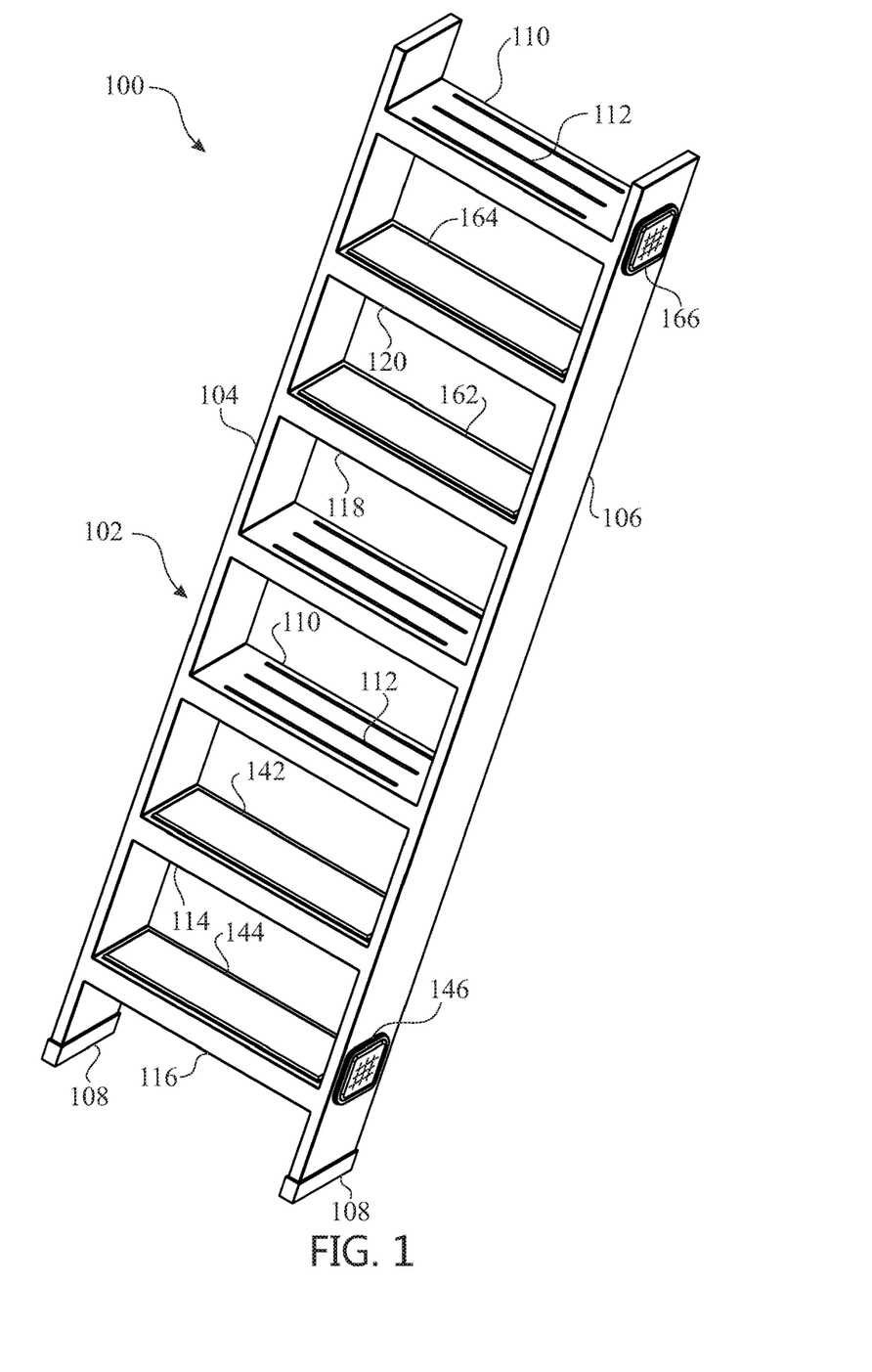
FIG. 1 presents a right front perspective view of a ladder embodying the present invention, wherein top rungs and bottom rungs incorporate sensors to activate an alarm upon detection of a climber approaching a top or bottom end of the ladder.
Figure 2:
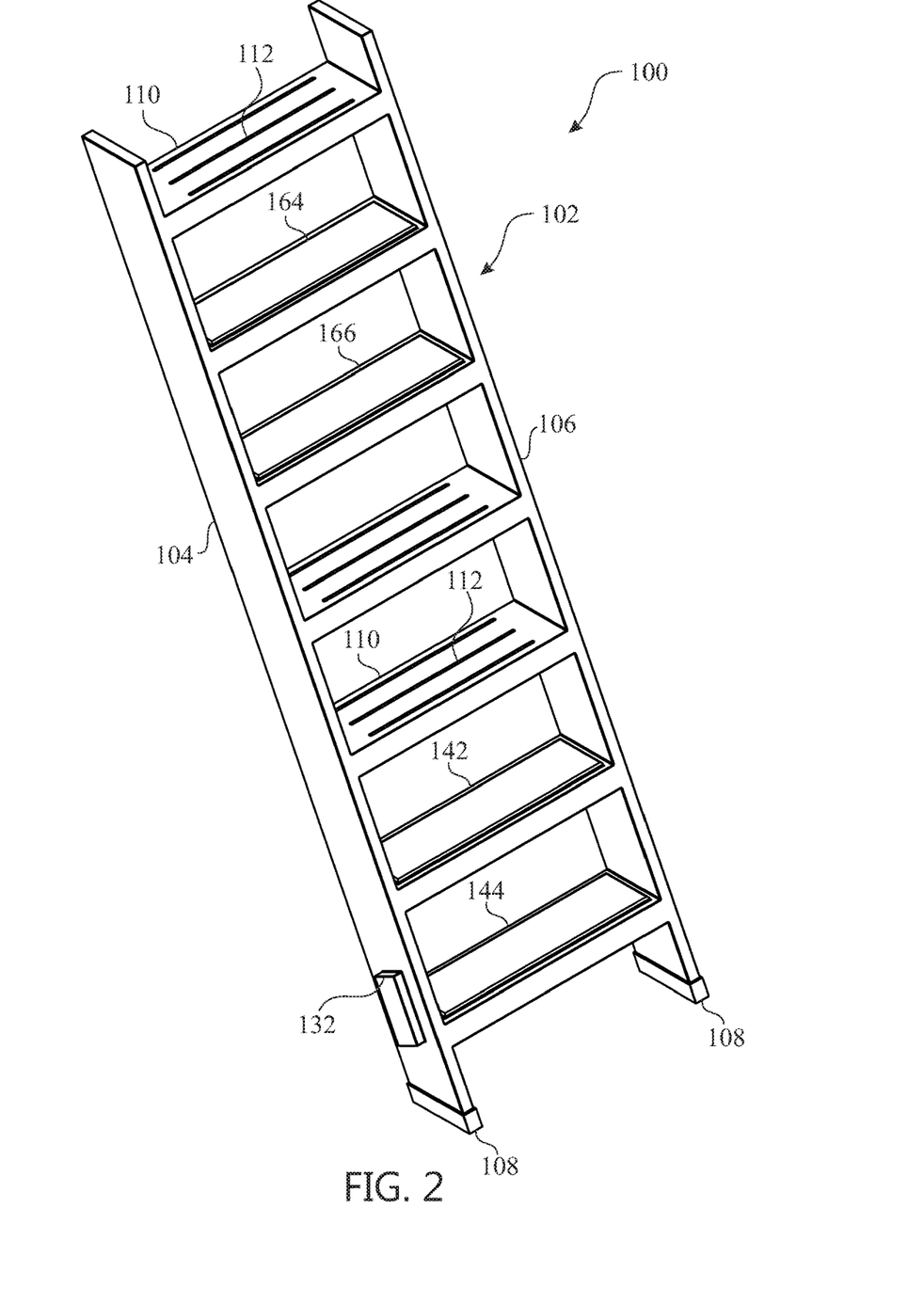
FIG. 2 presents a left front perspective view of the ladder of FIG. 1.
Figure 3:
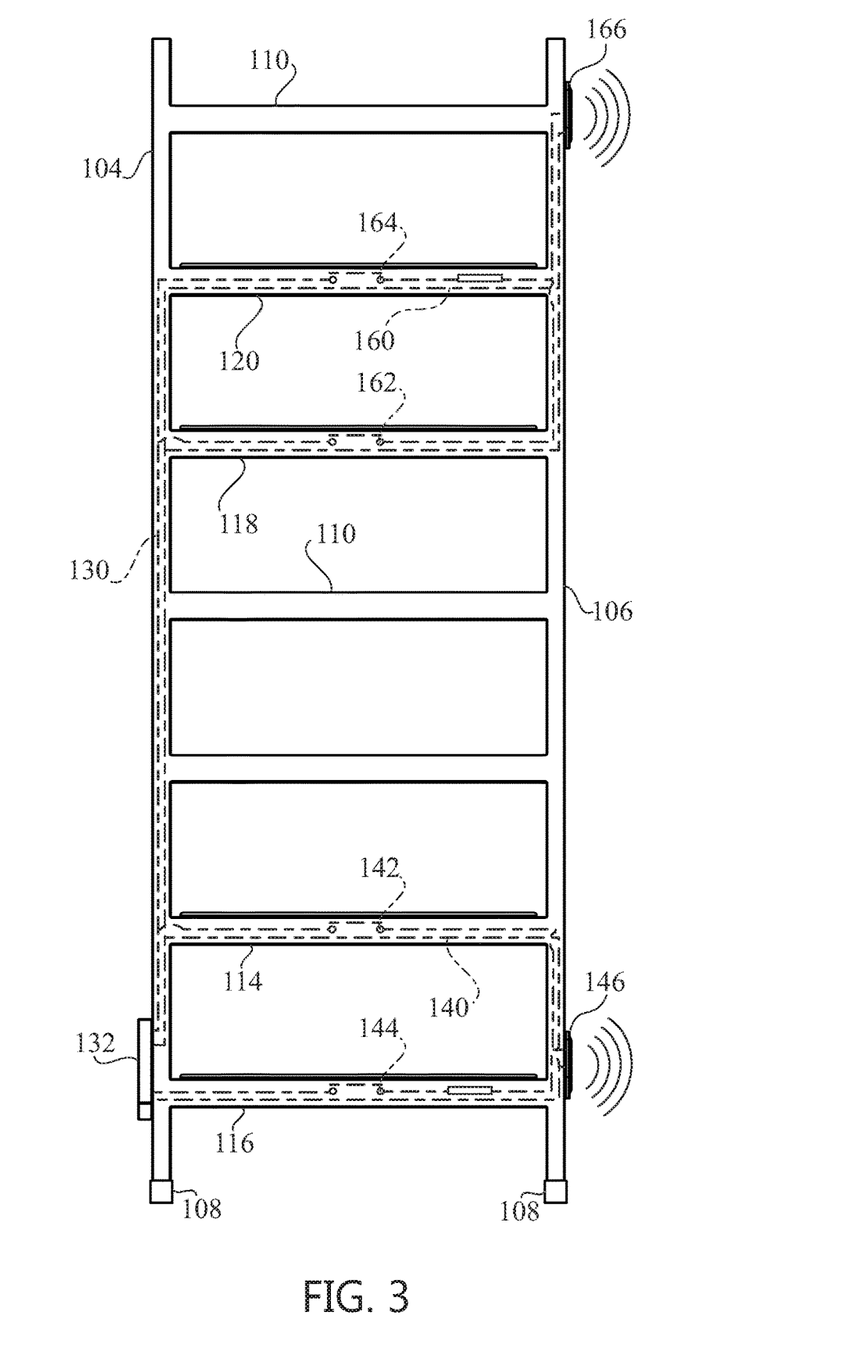
FIG. 3 presents a front elevation view of the ladder of FIG. 1.

In one exemplary implementation, a safety ladder 100 is shown in FIGS. 1-3, illustrating its various components where a ladder 102 is generally comprised of a left vertical stile 104 and a right vertical stile 106 laterally separated one from the other with a plurality of substantially regularly positioned rungs 110 affixed at opposite rung ends to stiles 104 and 106 and extending therebetween. The rungs 110 can also include treads 112 thereon to prevent a user from slipping. A foot 108 at the bottom of each stile 104, 106 can help to stabilize the ladder 102. In this exemplary implementation, the safety ladder 100 may include a single warning circuit 140 or, alternatively, a dual warning circuit 130 that substantially combines a lower warning circuit 140 with an upper warning circuit 160 (see FIG. 5) to provide a user with a warning signal, such as an audible warning that the user has reached either an uppermost safe limit while ascending toward a top of the ladder or a lowermost safe limit while descending toward a bottom of the ladder.

Referring now to FIGS. 1-3 and FIGS. 5-6, the dual warning circuit 130 may be powered by a battery 132 having a power output terminal 134 (i.e. positive terminal) and a common terminal 136 (i.e. negative terminal). The lower warning circuit 140 functions to warn a user when he has reached a lower pair of rungs 114, 116 of the safety ladder 100 while descending the safety ladder. A first sensor 142 may be affixed to, or otherwise integrated or coupled with, a first lower rung 114 (as shown the rung 114 is the second rung from the bottom), and as configured the first sensor 142 may be a normally open push-to-make switch. As used herein, the term "normally open push-to-make switch" is intended to refer to an electronic component that is normally in an open state, but remains in a closed state as long as there is the presence of a continuing force (e.g. the downward force of the weight of a person having a foot supported on the rung). A second sensor 144 is affixed to a second lower rung 116 below first lower rung 114, and as configured the second sensor 144 may be a normally open momentary push-to-make switch. As used herein, the term "open momentary push-to-make switch" is intended to refer to an electronic component that is only momentarily closed and then returns to an "open" state despite the presence of a continuing force (e.g. the downward force of the weight of a person having a foot supported on the rung). By way of example, second sensor 144 may be a piezo switch. As should be well known to those skilled in the art, a piezo switch is an electrical switch based on the piezoelectric effect. The charge generated by the piezoelectric element in the switch is typically used to turn on an integrated semiconductor device such as a field effect transistor (FET), causing the switch assembly's output to be active, or "on." When the FET is on, current can flow through it as with a conventional metal contact-based switch. After the voltage pulse is dissipated in the gate resistor, the FET turns back "off," its normal high impedance state. The piezoelectric effect uses the fact that a force applied to certain materials causes stresses that generate the electric charge. In the case of piezo switches, the force could be compressive pressure (e.g. the aforementioned downward pressure of the foot of an individual standing upon a ladder rung) that causes the (typically disc-shaped) piezo element to bend very slightly like a drumhead. Thus, piezo switches produce a single, brief "on" pulse. This pulse can vary with the amount of pressure which is applied, since higher pressures generate higher voltages which take longer to dissipate. A capacitor may be used to store the charge in order to lengthen the time constant of the gate circuit and therefore the width of the pulse. With additional circuitry (as is well known in the art) this pulse can be extended further or used to change the state of an output from steady "Off" to steady "On" by toggling a flip-flop. Piezo switches have some advantages over their conventional mechanical counterparts. One is that there are no moving parts, just the small deformation on the front plate and the piezo element (typically a few micrometers). This means the lifetime of such a switch can be ensured to be tens of millions of operations, since there is no wear involved. Another advantage is that they may easily be completely sealed from the environment and thus made weatherproof. They are often constructed with stainless steel housings such that they are resistant to damage by vandals or heavy use.

Figure 5:
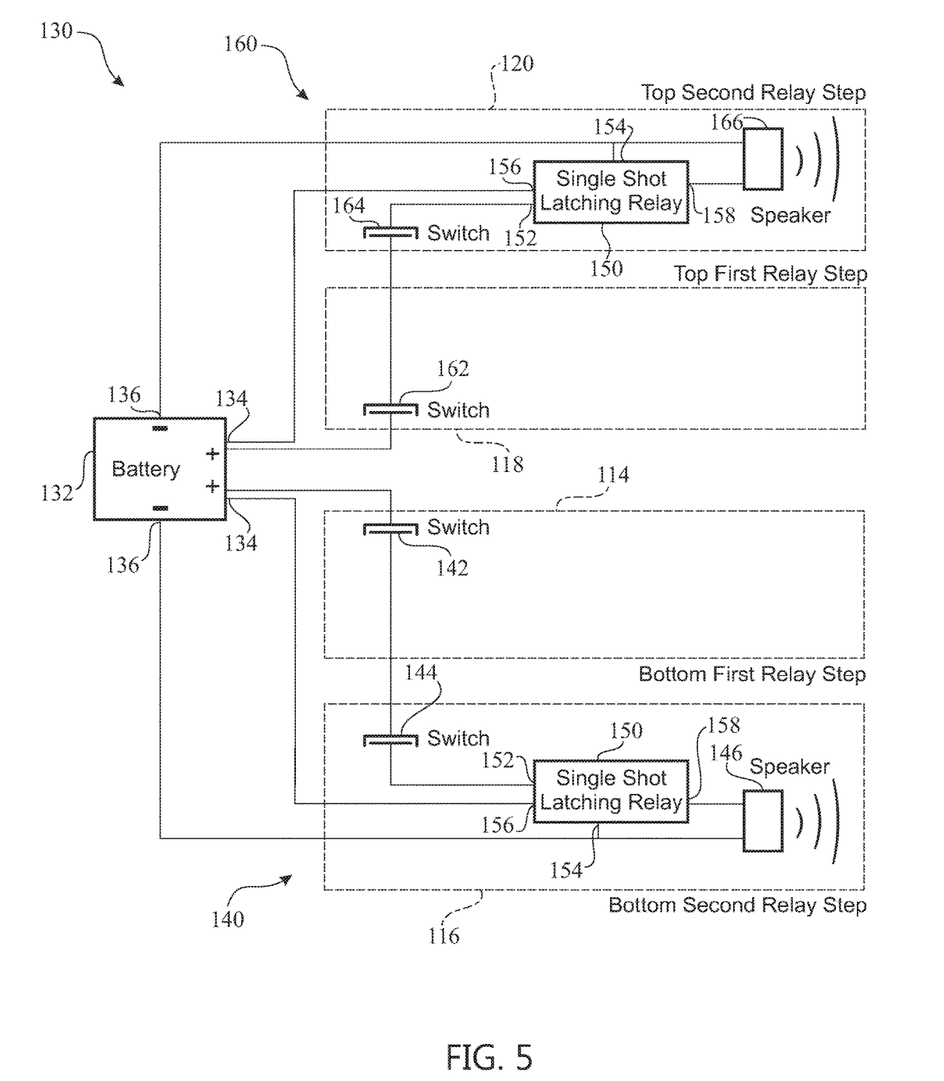
FIG. 5 presents a circuit diagram of an exemplary representative ladder incorporating warning alarms at a top and bottom of the ladder.
Figure 6:
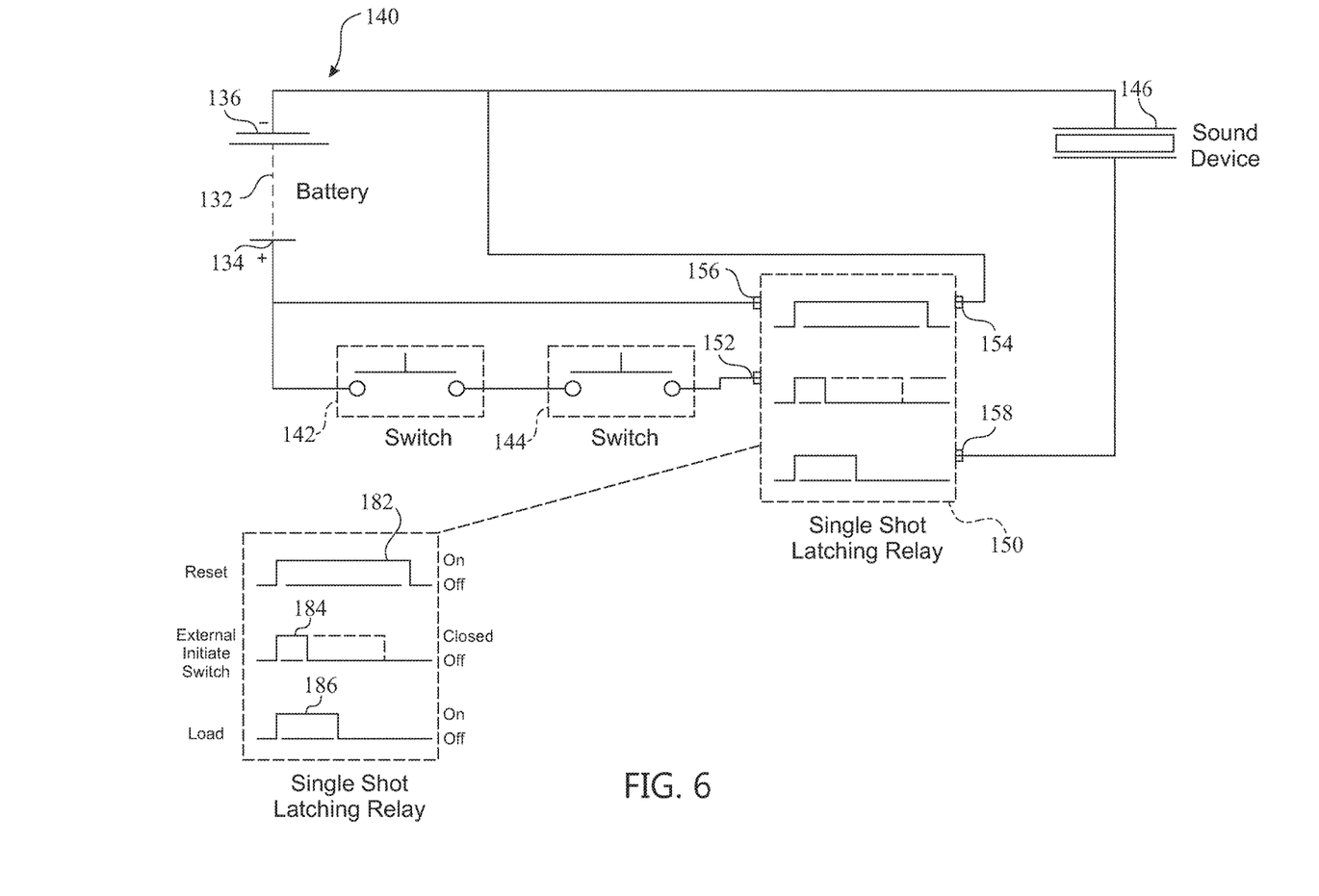
FIG. 6 presents a representative exemplary circuit diagram for a single alarm circuit for use on a ladder.

The first sensor 142 and the second sensor 144 are preferably electrically connected one to the other in series. The first sensor 142 may also be connected to the positive terminal 134 of a power source, such as battery 132. Preferably, the second sensor 144 is further connected to a start switch terminal 152 of a relay 150, such as the exemplary single shot latching relay referenced herein. The relay 150 preferably includes a common terminal 154 connected to the negative terminal 136 of the battery 132. A power input terminal 156 is connected to the positive terminal 134 of the battery 132. The relay 150 may further include a load output terminal 158 which is connected to a climber warning device; for example, a sound device 146 such as a piezo sound generator. In this exemplary implementation, the sound device 146 is also connected to the negative terminal 136 of the battery 132 to complete the circuit. While the lower pair of rungs 114, 116 is illustrated as the bottommost two rungs a different pair of lower rungs may be chosen for incorporation of the lower warning circuit 140.

In similar fashion, the upper warning circuit 160 may function to warn a climber ascending the safety ladder 100 upon reaching an upper pair of adjacent rungs 118, 120. A first sensor 162 may be affixed to, or otherwise integrated or coupled with, a first upper rung 118 and as configured the first sensor 162 may be a normally open push-to-make switch. As used herein, the term "normally open push-to-make switch" is intended to refer to an electronic component that is normally in an open state, but remains in a closed state as long as there is the presence of a continuous force (e.g. the downward force of the weight of a person having a foot supported on the rung). A second sensor 164 may be affixed to, or otherwise integrated or coupled with, a second upper rung 120 above first upper rung 118, and as configured the second sensor 164 may be a normally open momentary push-to-make switch. As used herein, the term "open momentary push-to-make switch" is intended to refer to an electronic component that is only momentarily closed and then returns to an "open" state despite the presence of a continuing force (e.g. the downward force of the weight of a person having a foot supported on the rung). By way of example, second sensor 164 may be a piezo switch.

The first sensor 162 and the second sensor 164 are preferably electrically connected one to the other in series. The first sensor 162 may also be connected to the positive terminal 134 of a power source, such as battery 132. Preferably, the second sensor 164 is further connected to a start switch terminal 152 of a relay 150, such as the exemplary single shot latching relay referenced herein. The relay 150 preferably includes a common terminal 154 connected to the negative terminal 136 of the battery 132. A power input terminal 156 is connected to the positive terminal 134 of the battery 132. The relay 150 may further include a load output terminal 158 which is connected to a climber warning device; for example, a sound device 166 such as a piezo sound generator. In this exemplary implementation, the sound device 166 is also connected to the negative terminal 136 of the battery 132 to complete the circuit. The upper pair of rungs 118, 120 is typically not the uppermost pair of rungs 110, but the rung pair is typically representative of the uppermost rungs to which a user may safely climb.

The functionality of the single shot latching relay 150 is illustrated in FIG. 6 wherein step curve 182 illustrates the power input over time to the power input terminal 156 of the relay 150. The step curve 184 illustrates the momentary power pulse to activate the load output of the relay 150, and the step curve 186 illustrates the timed power output to the sound devices 146, 166.

Figure 4:
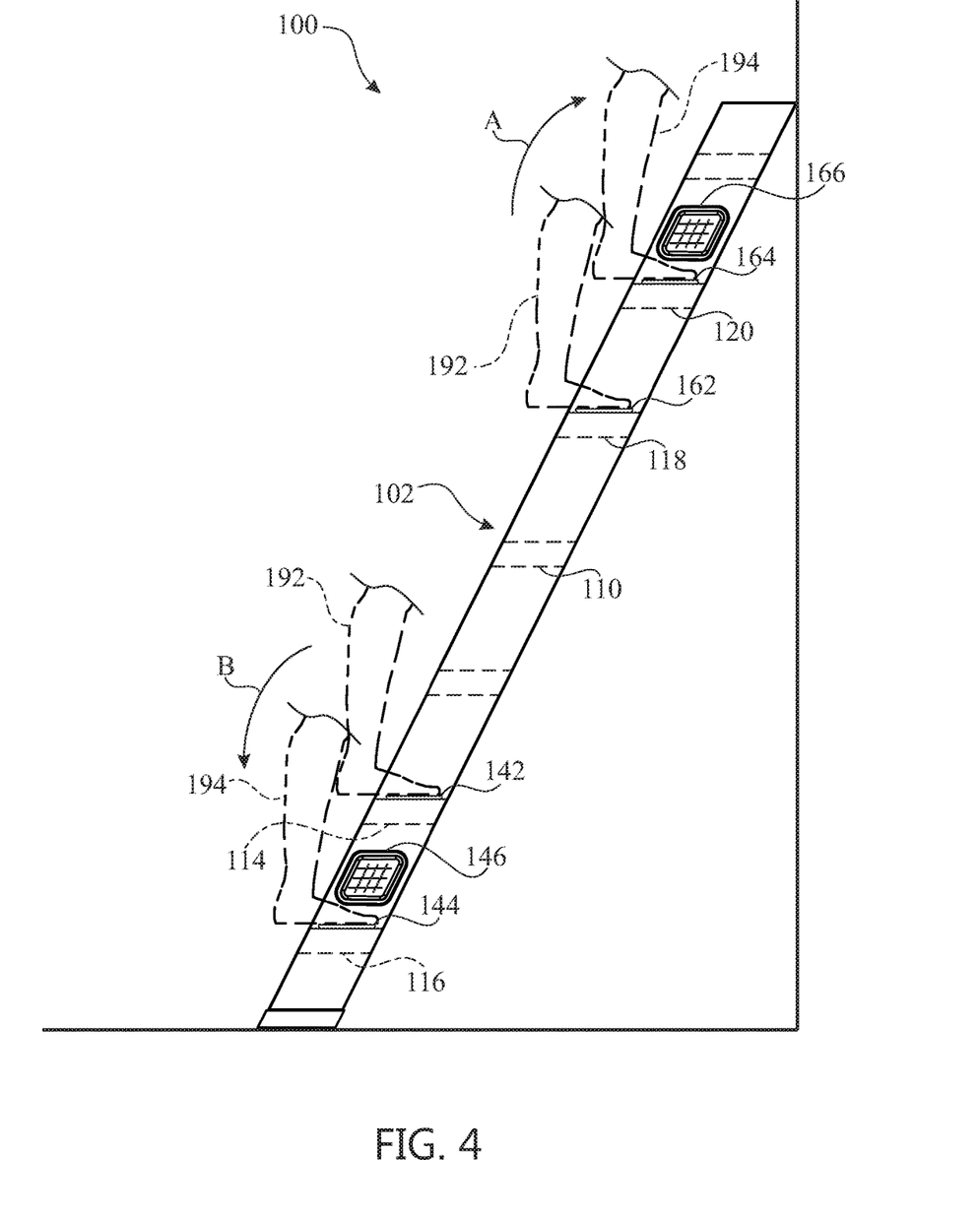
FIG. 4 presents a right side elevation view illustrating a climber approaching bottom rungs while descending the ladder of FIG. 1 and a climber approaching upper rungs while ascending the ladder of FIG. 1.

In use, as illustrated in FIG. 4 and also in reference to FIG. 5, a user climbs the safety ladder 102. When approaching a top of the safety ladder 100, the user's first, foot 192 steps on the first upper rung 118 which closes the normally open switch 162. As the user continues to climb his weight is supported by the first foot 192 while his second foot 194 is raised to the second upper rung 120. As he begins to shift his weight from his first foot 192 to his second foot 194, switch 164 (e.g. a piezo electric switch) closes temporarily while the normally open switch 162 remains closed. The normally open momentary switch 164 only closes momentarily and then resets to an open state even though the user's second foot 194 continues to put pressure on the switch 164. The momentary closing of the normally open momentary switch 164 is sufficient to complete the current path from the positive terminal 134 of the battery 132 to the start switch terminal 152 of the relay 150 thereby generating the step curve 184 to activate the load output of the relay 150. The single shot latching relay 150 then generates the load output represented by the step curve 186 at load output terminal 158 which continues for a predetermined time duration that is longer than the time duration of the momentary triggering pulse 184. The output load 186 drives the sound device 166 to provide an audible warning for the time duration of the output load represented by the step curve 186 thereby indicating that the user has reached the uppermost safety limit of the safety ladder 100.

Similarly, when the user has completed his task at the top of the safety ladder 100 he begins to descend. When approaching a bottom of the safety ladder 100, the user's first foot 192 steps on the first lower rung 114, which functions to close the normally open switch 142. As the user continues to descend, his weight is supported by the first foot 192 while his second foot 194 is lowered to the second lower rung 116. As he begins to shift his weight from his first foot 192 to his second foot 194, the normally open momentary switch 144 closes and the normally open switch 142 remains closed. The normally open momentary switch 144 only closes momentarily and then resets to an open state even though the user's second foot 194 continues to put pressure on the switch 144. The momentary closing of the normally open momentary switch 144 is sufficient to complete the current path from the positive terminal 134 of the battery 132 to the start switch terminal 152 of the relay 150 thereby generating the step curve 184 to activate the load output of the relay 150. The single shot latching relay 150 then generates the load output represented by the step curve 186 at the load output terminal 158 which continues for a predetermined time duration that is longer than the time duration of the momentary triggering pulse 184. The output load 186 drives the sound device 146 to provide an audible warning for the time duration of the load output represented by the step curve 186 thereby indicating that the user has reached the bottom of the safety ladder 100.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An electronic warning circuit for installation on a ladder of the type having a plurality of spaced apart rungs for warning a user of approaching an end of the ladder in a single direction, said electronic warning circuit comprising:
   a first sensor comprising an electrical switch, affixed to a first one of a pair of rungs of a ladder proximate an end thereof, responding to placement of a first of a user's feet on said first sensor by changing said first sensor from a non-conducting state to a conducting state, for an entire time the first of the user's feet is placed on the first sensor;
   a second sensor comprising a piezo switch electrically connected in series with said first sensor, affixed to a second adjacent one of the pair of rungs of the ladder proximate the end thereof, responding to placement of a second of the user's feet on said second sensor by changing said second sensor from a non-conducting state to a conducting state beginning from the time of initial placement of the second of the user's feet on said second sensor, for a predetermined period of time, and returning to the non-conducting state after the predetermined period of time has elapsed, said predetermined period of time being less than the time the user takes to move his feet from one rung to the next rung;
   a latching relay having a start terminal electrically connected to said second sensor, said latching relay also having a power input terminal a common terminal and a load output terminal;
   a power source having a power output terminal electrically connected to said first sensor and said power input terminal of said latching relay, said power source also having a common terminal; and
   a warning alert device electrically connected to said load output terminal of said latching relay and to said common terminal of said power source to complete said electronic warning circuit;
   wherein said load output terminal of said latching relay, and thereby said warning alert device, are energized when both said first and second sensors are in conducting states at the same time in response to placement of the first and second feet of said user on said first and second sensors as the user moves in the direction of the first rung to the second rung.

2. The electronic warning circuit according to claim 1 wherein said latching relay is a single shot latching relay.

3. The electronic warning circuit according to claim 2 wherein said load output terminal of said latching relay, when energized, is energized for a predetermined period of time and is then de-energized.

4. The electronic warning circuit according to claim 1 wherein said power source is a battery, said power output terminal being a positive terminal of said battery, and said common terminal being a negative terminal of said battery.

5. The electronic warning circuit according to claim 1 wherein said warning alert device is a piezo sound generator.

6. A safety ladder incorporating a warning circuit indicating when a user approaches an end of said safety ladder, said safety ladder comprising:
   a ladder having two stiles laterally spaced one from the other and a plurality of rungs substantially regularly spaced therealong, said rungs affixed to and laterally extending between said stiles; and
   an electronic warning circuit sensing a user approaching an end of said ladder in a single direction and issuing an audible warning in response thereto, said electronic warning circuit comprising:
      a first sensor affixed to a first of two adjacent rungs proximate said end of said ladder and responsive to the placement of a first of a user's feet on said first sensor by changing said first sensor from a non-conducting state to a conducting state, for an entire time the first of the user's feet is placed on the first sensor;
      a second sensor comprising a piezo electric switch affixed to a second of said two adjacent rungs proximate said end of said ladder and responsive to the placement of a second of the user's feet on said second sensor by changing said second sensor from a non-conducting state to a conducting state beginning from the time of initial placement of the second of the user's feet on said second sensor, for a predetermined period of time, and returning to the non-conducting state after the predetermined period of time has elapsed, said predetermined period of time being less than the time the user takes to move his feet from one rung to the next rung, said second sensor being electrically connected in series to said first sensor;

a latching relay having a start terminal electrically connected to said second sensor, said latching relay also having a power input terminal, a common terminal, and a load output terminal;

a power source having a power output terminal electrically connected to said first sensor and said power input terminal of said latching relay, said power source also having a common terminal; and a warning alert device electrically connected to said load output terminal of said latching relay and to said common terminal of said power source to complete said electronic warning circuit;

wherein said load output terminal of said latching relay and thereby said alert warning device, are energized when both said first and second sensors are in conducting states at the same time in response to placement of the first and second feet of the user on said first and second sensors as the user moves in the direction of the first rung to the second rung.

7. The safety ladder according to claim 6 wherein said latching relay is a single shot latching relay.

8. The safety ladder according to claim 7 wherein said load output terminal of said latching relay, when energized, is energized for a predetermined period of time and is then de-energized.

9. The safety ladder according to claim 7 wherein said first and second sensors are both switches.

10. The safety ladder according to claim 6 wherein said power source is a battery, said power output terminal being a positive terminal of said battery, and said common terminal being a negative terminal of said battery.

11. The safety ladder according to claim 6 wherein said warning alert device is a piezo sound generator.

12. The safety ladder according to claim 6 wherein said two adjacent rungs are proximate to a top of said ladder and wherein said first rung is a lower one of said two adjacent rungs and said second rung is an upper one of said two adjacent rungs.

13. The safety ladder according to claim 6 wherein said two adjacent rungs are a lowermost two rungs of said ladder and wherein said first rung is an upper one of said two adjacent rungs and said second rung is a lowermost rung of said two adjacent rungs.

14. A climbable structure having a series of foot supporting members incorporating a warning circuit indicating when a user approaches a top or a bottom of said climbable structure, said climbable structure comprising:

an upper electronic warning circuit incorporated with two vertically adjacent foot supporting members proximate to a top of said climbable structure and sensing a user ascending said structure, said upper electronic warning circuit issuing a warning alert in response thereto, said upper electronic warning circuit comprising:

a first sensor affixed to a lower one of said two upper adjacent foot supporting members and responsive to the placement of a first of a user's feet on said first sensor by changing said first sensor from a non-conducting state to a conducting state, for an entire time the first of the user's feet is placed on the first sensor;

a second sensor affixed to an upper one of said two upper foot supporting members and responsive to the placement of a second of the user's feet on said second sensor by changing said second sensor from a non-conducting state to a conducting state beginning from the time of initial placement of the second of the user's feet on said second sensor, for a predetermined period of time, and returning to the non-conducting state after the predetermined period of time has elapsed, said predetermined period of time being less than the time the user takes to move his feet from one foot supporting member to the next foot supporting member, said second sensor being electrically connected in series to said first sensor;

a first single shot latching relay having a start terminal electrically connected to said second sensor, said first single shot latching relay also having a power input terminal, a common terminal, and a load output terminal;

a first power source having a power output terminal electrically connected to said first sensor and said power input terminal of said first single shot latching relay, said first power source also having a common terminal; and a first warning alert device electrically connected to said load output terminal of said first single shot latching relay and to said common terminal of said first power source to complete said upper electronic warning circuit;

wherein said load output terminal of said first single shot latching-relay, and thereby said first warning alert device, are energized when both said first and second sensors are in conducting states at the same time in response to placement of the first and second feet of the user on said first and second sensors as the user ascends; and a lower electronic warning circuit incorporated with two adjacent lowermost foot supporting members of said climbable structure and sensing the user descending said structure, said lower electronic warning circuit issuing a warning alert in response thereto, said lower electronic warning circuit comprising:

a third sensor affixed to an upper one of said two lowermost adjacent foot supporting members and responsive to the placement of a first of a user's feet on said third sensor by changing said third sensor from a non-conducting state to a conducting state, for an entire time the first of the user's feet is placed on the third sensor;

a fourth sensor affixed to a lower one of said two lowermost adjacent foot supporting members and responsive to the placement of a second of the user's feet on said fourth sensor by changing said fourth sensor from a non-conducting state to a conducting state beginning from the time of initial placement of the second of the user's feet on said fourth sensor, for a predetermined period of time, and returning to the non-conducting state after the predetermined period of time has elapsed, said predetermined period of time being less than the time the user takes to move his feet from one foot supporting member to the next foot supporting member, said fourth sensor being electrically connected in series to said third sensor;

a second single shot latching relay having a start terminal electrically connected to said fourth sensor, said second single shot latching relay also having a power input terminal, a common terminal, and a load output terminal;

a second power source having a power output terminal electrically connected to said third sensor and said power input terminal of said second single shot latching relay, said second power source also having a common terminal; and a second sound device electrically connected to said load output terminal of said second single shot latching relay and to said common terminal of said second power source to complete said lower electronic warning circuit;

wherein, said load output terminal of said second single shot latching relay, and thereby said second sound device, are energized when both said third and fourth sensors are in conducting states at the same time in response to placement of the first and second feet of the user on said third and fourth sensors as the user descends.

15. The climbable structure according to claim 14 wherein said first, second, third and fourth sensors are switches.

16. The climbable structure according to claim 15, wherein said second and fourth sensors further comprise piezo switches.

17. The climbable structure according to claim 14, wherein said second and fourth sensors further comprise piezo switches.

* * * * *